(12) United States Patent
Homoceanu (10) Patent No.: US 11,520,350 B2
(45) Date of Patent: Dec. 6, 2022

(54) PROCESS AND SYSTEM FOR SUPPORTING AN AUTONOMOUS VEHICLE

(71) Applicant: VOLKSWAGEN AKTIENGESELLSCHAFT, Wolfsburg (DE)

(72) Inventor: Silviu Homoceanu, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 368 days.

(21) Appl. No.: 16/690,117

(22) Filed: Nov. 20, 2019

(65) Prior Publication Data
US 2020/0166947 A1 May 28, 2020

(30) Foreign Application Priority Data
Nov. 22, 2018 (DE) .......................... 102018219984.1

(51) Int. Cl.
*G05D 1/02* (2020.01)
*G06F 16/58* (2019.01)
(Continued)

(52) U.S. Cl.
CPC ......... *G05D 1/0276* (2013.01); *G05D 1/0088* (2013.01); *G06F 16/383* (2019.01);
(Continued)

(58) Field of Classification Search
CPC ............... G05D 1/0276; G05D 1/0088; G05D 2201/0213; G06F 16/383; G06F 16/5866;
(Continued)

(56) References Cited

U.S. PATENT DOCUMENTS 9,110,882 B2 * 8/2015 Overell ..................... G06N 5/02
9,495,874 B1 11/2016 Zhu et al.
(Continued)

FOREIGN PATENT DOCUMENTS

CN 108700879 A1 10/2018
DE 102009016580 A1 10/2010
(Continued)

OTHER PUBLICATIONS

Office Action in co-pending DE Application No. 102018219984.1, dated Jun. 17, 2019, 5 pages.
(Continued)

*Primary Examiner* — Rodney A Butler
(74) *Attorney, Agent, or Firm* — Loza & Loza, LLP; Peter Zura (57) ABSTRACT

Technologies and techniques for supporting an autonomous vehicle wherein objects in surroundings of the vehicle are captured by a sensor system, and wherein objects are identified and recognized by object recognition from captured data relating to the surroundings. When an unknown object is present in the surroundings, the unknown object if found in at least one database, typical properties of the unknown object are determined on the basis of the search result, a recommended course of action is derived for the autonomous vehicle on the basis of the typical properties of the unknown object, and the derived recommended course of action are provided to the vehicle.

17 Claims, 3 Drawing Sheets

(51) Int. Cl.
  *G06F 16/38* (2019.01)
  *G05D 1/00* (2006.01)
  *G06N 5/04* (2006.01)
  *G06V 20/56* (2022.01)
  *G06F 16/383* (2019.01)

(52) U.S. Cl.
  CPC ........... *G06F 16/5866* (2019.01); *G06N 5/04* (2013.01); *G06V 20/56* (2022.01); *G05D 2201/0213* (2013.01)

(58) Field of Classification Search
  CPC ............ G06N 5/04; G06N 5/02; G06V 20/56; G06V 2201/10; G06V 10/751; G06V 20/58; B60W 2420/42; B60W 30/09; B60W 60/0015; B60W 30/0956; B60W 30/08
  See application file for complete search history.

(56) References Cited

U.S. PATENT DOCUMENTS

| | | |
|---|---|---|
| 2009/0202107 A1 | 8/2009 | Wilson |
| 2011/0307435 A1 | 12/2011 | Overell et al. |
| 2014/0247963 A1 | 9/2014 | Lin et al. |
| 2015/0067008 A1 | 3/2015 | Kamath et al. |
| 2018/0188738 A1 | 7/2018 | Tatourian et al. |
| 2018/0211128 A1* | 7/2018 | Hotson .................. G06V 20/00 |
| 2018/0217607 A1 | 8/2018 | Ren et al. |
| 2019/0080453 A1* | 3/2019 | Song .................... G06V 20/698 |

FOREIGN PATENT DOCUMENTS

| | | |
|---|---|---|
| DE | 102012107886 A1 | 2/2014 |
| DE | 102015006255 A1 | 12/2015 |
| DE | 102015006255 T5 | 12/2015 |

OTHER PUBLICATIONS

Deng et al. "ImageNet: A Large-Scale Hierarchical Image Database." 2009 IEEE Conference on Computer Vision and Pattern Recognition, Miami, FL, 2009, pp. 248-255.
CN Serial No. 201911154572.4 Examination Report (dated Sep. 7, 2022).

* cited by examiner

PROCESS AND SYSTEM FOR SUPPORTING AN AUTONOMOUS VEHICLE

RELATED APPLICATIONS

The present application claims priority under 35 U.S.C. § 119 to German Pat. App. No. DE 102018219984.1, titled "A Process and System for Supporting an Autonomous Vehicle," filed Nov. 22, 2018, the contents of which is incorporated by reference in its entirety herein.

TECHNICAL FIELD

The invention relates to a process and a system for supporting an autonomous vehicle.

BACKGROUND

Corner cases, in particular the appearance of unknown objects in the surroundings, pose a major challenge for autonomous vehicles. The reason for this is that algorithmic processes or artificial-intelligence-based processes cannot recognize all objects, due to the large number of objects that can be encountered in any surroundings. Therefore, situations occur, again and again, when unrecognized objects are present in the surroundings of the vehicle. Such objects may be, for example, animals, persons on a roadway, accumulations of leaves or other objects which are generally not or only seldom encountered in traffic. In such a situation, the vehicle usually stops the autonomous trip and awaits a human operator's instructions.

DE 10 2015 006 255 T5 discloses an object recognition device. This object recognition device includes a capturing unit configured to capture a recognition target image serving as an object to be recognized; a retrieval unit configured to search an image database storing a plurality of image data in association with tag information and to retrieve a similar image that matches the recognition target image; and a recognition unit configured to recognize the object contained in the recognition target image on the basis of tag information associated with a similar image obtained by the retrieval unit. The recognition action may select the tag information that is most frequently encountered among the pieces of tag information that is associated with the similar image as a recognition result. The recognition unit may also calculate a tag information reliability score of the similar image in the retrieval result and recognize an object taking into account the reliability score.

US 2018/0217607 A1 discloses a system for object recognition. In this case, objects are recognized in captured sensor data on the basis of a road object database, an image feature database and/or an Internet-coupled database and taken into account for autonomous driving.

DE 10 2009 016 580 A1 discloses a data processing system and a process for providing at least one driver assistance function. By capturing an image, a stationary receiving unit for receiving image data receives the surroundings of the vehicle by means of at least one image capturing unit of a vehicle and generates image data. A stationary processing unit processes at least a part of the received image data, wherein the stationary processing unit generates driver assistance data with at least one piece of driver assistance information on the basis of the image data, wherein, with the aid of the generated driver assistance information, at least one piece of driver assistance information can be generated in the vehicle. A sending unit sends the driver assistance data to the vehicle.

DE 10 2012 107 886 A1 discloses a process for electronic recognition of traffic signs, wherein basic patterns, which are typical of a traffic sign, are recognized from the image data from a camera disposed in a vehicle, wherein it is provided for the data of the recognized basic pattern to be transferred wirelessly to an external server unit by means of a communication device of the vehicle for transmitting and receiving data, pattern recognition to be carried out by means of a pattern recognition algorithm from the external server unit, and as a result of the pattern recognition the data of the recognized traffic sign to be transferred to the communication unit of the vehicle, and a corresponding traffic sign to be shown, in particular, on a display unit.

U.S. Pat. No. 9,495,874 B1 discloses a process and apparatus for determining one or more behavior models used by an autonomous vehicle to predict the behavior of detected objects. The autonomous vehicle may collect and record the object behavior using one or more sensors. The autonomous vehicle may then communicate the recorded object behavior to a server operative to determine the behavior models. The server may determine the behavior models according to a given object classification, actions of interest performed by the object, and the object's perceived surroundings.

Methods for handling unknown objects while engaging in autonomous driving are currently unsatisfactory.

The present disclosure is based on the object of providing a process and a system for supporting an autonomous vehicle, which improves the handling of unknown objects in the surroundings of the vehicle.

BRIEF SUMMARY

In some illustrative embodiments, a process is disclosed for supporting an autonomous vehicle, wherein objects in the surroundings of the vehicle are captured by means of a sensor system, and wherein objects are identified and recognized from captured data relating to the surroundings by means of an object recognition means, and if an unknown object is present in the surroundings, the following steps are performed: (a) searching for the unknown object in at least one database by means of a searching means, (b) determining typical properties of the unknown object on the basis of the search result by means of the searching means, (c) deriving a recommended course of action for the autonomous vehicle on the basis of the typical properties of the unknown object by means of a recommendation means, (d) providing the derived recommended course of action.

In some illustrative embodiments, a system is disclosed for supporting autonomous travel of a vehicle is provided, wherein objects in the surroundings of the vehicle are captured by means of a sensor system, and wherein objects are identified and recognized from captured data relating to the surroundings by means of an object recognition means comprising a searching means and a recommendation means, wherein the searching means is configured to find, in the presence of an unknown object in the surroundings, the unknown object in at least one database and to determine typical properties of the unknown object on the basis of the search result, and wherein the recommendation means is configured to derive and provide a recommended course of action for the autonomous vehicle on the basis of the typical properties.

BRIEF DESCRIPTION OF THE FIGURES

The invention will be explained in more detail below with reference to preferred exemplary embodiments and with reference to the figures.

DETAILED DESCRIPTION

The present disclosure provides technologies and techniques to identify an unknown object, to isolate the associated data relating to the surroundings and to use the isolated data relating to the surroundings to perform a search of at least one database by means of a searching means. In this context, features of the unknown object, such as, for example, a size, a surface property, or other geometric or material properties or, also, data derived from the data relating to the surroundings can be used as search parameters. For the communication with the at least one database, the system has the corresponding software and hardware interface(s). Any communication with the at least one database can take place, for example, via an Internet connection. The at least one then supplies a search result that contains and/or proposes, for example, similar objects. The search result can be further processed or used to refine the search. A further basic idea of the invention is determining typical properties of the unknown object on the basis of the search result by means of the searching means. Typical properties herein are physical properties of the unknown object, such as, for example, a size, a shape, a mass, a volume and/or a material property, such as a material composition, a hardness, a brittleness, an elasticity or deformability, and/or a density. The typical properties are also searched in a database or queried from the same. In this context, the physical properties can be determined on the basis of a context-based search. On the basis of the determined typical properties, that is the physical properties, a recommended course of action is derived for the autonomous vehicle by means of a recommendation means. For example, physical models are used to estimate based on the typical properties a reaction of the unknown object upon making contact or colliding with the vehicle. Depending on the result of this observation of a model, it is then decided, for example, whether the unknown object has to be bypassed or whether the unknown object can be driven over.

One advantage of the present disclosure is that a better response can be achieved relative to unknown objects, which represent a corner case for an autonomous vehicle. Objects that have not been trained in artificial intelligence, trained for autonomous travel or that are not taken into account by any other algorithm can, nevertheless, be considered by the system, without human intervention being necessary. As a result, autonomous travel is improved and a range of applications for autonomous vehicles can be increased.

The vehicle may, in particular, be a motor vehicle. The vehicle may also be another land, air or marine vehicle, for example, an aircraft, a drone, a transport or storage robot or a ship.

The sensor system can be configured, in principle, in a manner suitable for the specific application. For example, the sensor system may comprise at least one camera and/or Light Detection and Ranging (LIDAR) sensor system and/or an ultrasonic sensor system and/or a radar sensor system. It can be provided that the system comprises the sensor system. Alternatively, or in addition, the sensor system may be integrated as part of the vehicle.

The object recognition means disclosed herein identifies and recognizes objects in the surroundings of the vehicle. It is provided, in particular for features of identified objects to be determined, such as, for example, a size, a shape, a surface property, a reflection and/or remission and/or transmission capacity, etc. Based on these features, the object recognition means performs an object recognition. In the case of unknown objects (corner cases), the object recognition means can indeed identify the object, i. e. an object is detected in the surroundings; however, the object recognition means cannot recognize the object, for example, because the unknown object was not part of the training in a previous artificial intelligence training of the object recognition means. After identifying the unknown object, the object recognition means isolates the associated data relating to the surroundings and makes it available to the searching means. In particular, it can be provided that the system comprises the object recognition means. Alternatively or in addition, however, the system may not comprise the object recognition means, so that the object recognition means is configured, for example, as a part of the vehicle and provides the data relating to the surroundings associated with the unknown object to the system.

In one embodiment of the system it is provided that the system comprises a recognition means, wherein the recognition means is configured to identify unknown objects in the captured data relating to the surroundings, to extract associated data relating to the surroundings and to provide the extracted data relating to the surroundings to the searching means. If the system also includes the object recognition means, the recognition means can be part of the object recognition means.

In one embodiment, it is provided that finding the unknown object is carried out on the basis of image-based data relating to the surroundings in an image database. The image database stores, in particular, images with a description in text form. In this case, the sensor system comprises a camera which captures image data as data relating to the surroundings. The search of the image database takes place, in particular, on the basis of an image index, i.e., the image database represents a pre-indexed space which is generated from individual dimensions of image features. These image features are, in particular, low-level features, such as, for example, patterns, colors and/or color gradients in the stored images, etc. The search is carried out by means of a distance metric which measures a distance of the image data associated with the unknown object to individual data records in the image database. Objects having image data that are similar to the unknown object have a smaller distance in this distance metric than objects that are dissimilar with the unknown object. As a search result, the search of the image database accordingly provides objects with the shortest distances, that is, objects that are most similar to the unknown object. For example, if the unknown object is a plastic bag lying on a roadway's surface, the search in the image database will yield, as a search result, plastic bags that are similar to said plastic bag in terms of visual appearance. For example, a publicly accessible image database where similar images of objects can be searched, is provided, for example, by "Google images" (images.google.com/).

In a further embodiment, it is provided that said finding comprises extracting metadata on the basis of the search result provided by the image database. The search result provided by the image database includes, in particular, images provided with term captions of objects which are similar to the unknown object. These terms describe the objects displayed in the images and are usually linked with the respective image through metadata, i. e. as an image caption or tag. The terms (in the case of a plastic bag, for example, the term "empty/full plastic bag") are extracted by the searching means. As a result, a number of term captions are available for the unknown object that describe at least one object that is similar to the unknown object.

In an improvement of an embodiment, it is provided that, based on the extracted metadata, a wordnet describing the unknown object (cf., for example, wordnet.princeton.edu) is created. This may, in particular, be achieved based on dictionaries in which terms similar or equivalent to the terms extracted from the metadata can be searched and collected. This wordnet is then used in determining the typical properties. The advantage is that the unknown object can be described in a more extensive and versatile way.

In another embodiment, it is provided that said determining of the typical properties comprises a search in a machine-readable database in which linked data are stored. This is achieved, in particular, on the basis of the extracted metadata and/or the caption terms contained in the metadata. In particular, said determining is to comprise a search in a freely available machine-readable database, for example, on the basis of Linked Open Data (cf., for example, "The Linked Open Data Cloud", lod-cloud.net/). In this case, individual data is stored interlinked, for example, on the basis of the Resource Description Framework (RDF), i.e., in the form of RDF graphs. In particular, for example, objects are linked with their properties (predicates) as individual entities, thereby enabling that these properties can be determined and queried via the corresponding object.

In one embodiment, it is provided that said determining of the typical properties comprises a search in a knowledge-based system. A knowledge-based system is an information system that maps knowledge via knowledge representation and knowledge modeling. In simple terms, "facts" are assigned in a structured way to individual objects ("things"). This is, in particular, a taxonomic placement, that is, there is a hierarchical classification of a subject area. Due to these "ontologies", it is possible to extract the meaning of terms and relate the same to a respective context. Here too, the already mentioned RDF standard can be used to achieve structuring. Usable as a knowledge-based system is, for example, the freely available DBpedia (wiki.dbpedia.org/) where knowledge from the online encyclopedia "Wikipedia" is stored in a structured and machine-readable format.

In another embodiment, it is provided that said determining of the typical properties comprises a search of unstructured data. Unstructured data can be present, in particular, as an unstructured document, for example, in the form of a continuous text that is not encoded in a machine-readable format. Even unstructured text, however, can provide valuable information about the typical properties of the unknown object. If, for example, the unstructured text contains the unknown object or a term describing the same in an equivalent manner, phrases that are commonly used in a description of properties can be searched and analyzed (e.g., "X has . . ." or "X is . . . ") in order to derive typical properties of the unknown object.

In another embodiment, it is provided that said determining of the typical properties takes place on the basis of predetermined relevant properties. This provides that only properties that are relevant for the subsequent recommended course of action are considered and a search and analysis effort can be reduced. Relevant properties are, in particular, physical properties that are to be observed with regard to any contact or collision by the unknown object with the vehicle, e. g., a weight, a size, a material and a deformability. For example, a color of or an imprint on the unknown object may not be relevant, as these items are generally not to be considered for the recommended course of action that must derived. In particular, a list of relevant properties can be stored in the searching means. The relevant properties stored in this list are then determined by the searching means in the manner as described.

It may also be provided that relevant properties are defined as a function of a specific situation in which the vehicle finds itself when the corner case occurs. For this purpose, another knowledge-based system can be provided that stores relevant properties for different situations (e. g., driving on a street, parking, driving in a pedestrian zone, driving in open terrain, off-road, etc.).

In one embodiment it is provided that in determining the typical properties, a typicality is estimated in relation to the typical properties of the unknown object, wherein the recommended course of action is also derived on the basis of the estimated typicality. The typicality herein is, in particular, a measure of how well a member of a category represents said category. In other words, it is estimated how well the typical properties can describe the unknown object. This way, the action of deriving the recommended course of action can be improved, because a measure of how well the typical properties apply relative to the unknown object is provided and can be taken into account when deriving the recommended course of action. Typicality can be expressed in terms of probabilities, in particular.

The described options for determining the typical properties provide, in particular, statistically usable results; that is, as a result, in particular, estimated probabilities for the presence of certain typical properties of the unknown object are provided which the recommendation means can utilize to derive a recommended course of action.

Portions of the system may be configured individually or in aggregate as a combination of hardware and software, for example as program code executed on a microcontroller or microprocessor.

Figure 1:
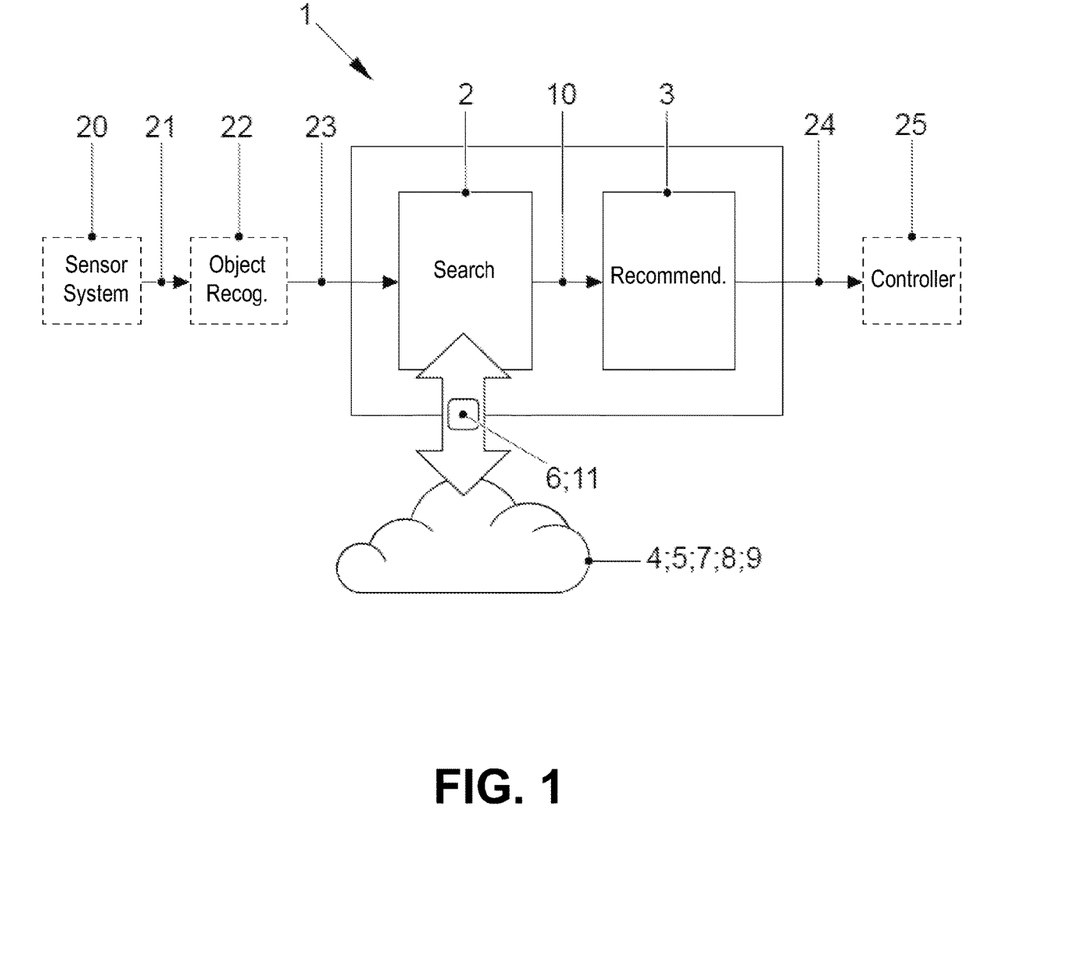
FIG. 1 shows a schematic representation of an embodiment of the system for supporting autonomous travel of a vehicle.

FIG. 1 shows a schematic representation of an embodiment of system 1 for supporting autonomous travel of a vehicle. System 1 comprises a searching means 2 and a recommendation means 3.

A sensor system 20 captures objects in the surroundings of the vehicle. Sensor system 20 comprises, here, for example, a camera. Objects may be identified and recognized by means of an object recognition means 22 from captured data 21 that relate to the surroundings. In alternative embodiments, it may be provided that system 1 comprises sensor system 20 and object recognition means 22.

If object recognition device 22 can not recognize an identified object, that is to say, an object detected in the surroundings, then associated data 23 relating to the surroundings are supplied to searching means 2. This data 23 relating to the surroundings comprise image data of the unknown object captured by means of the camera.

Searching means 2 then searches the unknown object in at least one database 4 on the basis of the image data. In particular, the at least one database 4 is a publicly accessible database in which data is freely available and retrievable. In this context, database 4 is an image database 5 indexed by individual image features. Image data of objects similar to the unknown object is found on the basis of a distance metric. Searching means 2 extracts metadata 11 from these similar objects and/or their image data; in particular, the metadata 11 is terms describing similar objects.

On the basis of search result 6 of the searching means, i.e., extracted metadata 11, in particular of the terms, searching means 2 determines typical properties 10 of the unknown object. In this case, typical properties 10 are physical properties that also characterize the unknown object, because it is similar to the objects found in the image database. Typical properties 10 are then supplied to recommendation means 3.

Typical properties 10 are determined, in particular, by means of a search of a machine-readable database 7 and/or a knowledge-based system 8 and/or unstructured data 9, as can be found, for example, in online web pages.

On the basis of typical properties 10, recommendation means 3 then derives a recommended course of action 24 for the autonomous vehicle. For example, physical models are used to estimate, on the basis of typical properties 10, a reaction of the unknown object upon making contact or collision with the vehicle. Depending on the result of this observation of a model, it is decided, for example, whether the unknown object must be bypassed or whether the unknown object can be driven over.

Recommended course of action 24 is then supplied, for example, to a controller 25 of the vehicle, which automatically controls the vehicle on the basis of recommended course of action 24.

Figure 2:
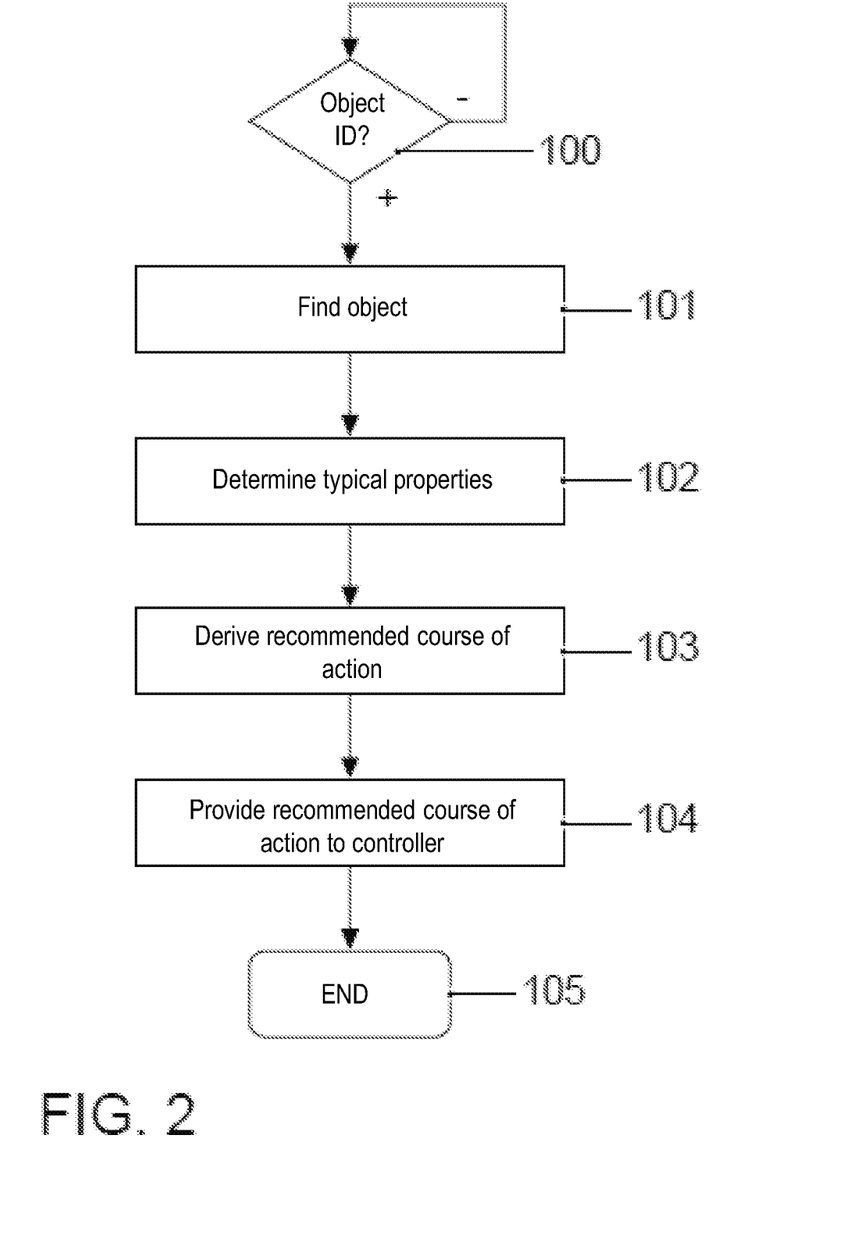
FIG. 2 shows a schematic flow diagram of one embodiment of the process for supporting autonomous travel of a vehicle.

FIG. 2 shows a schematic flow diagram of the process for supporting an autonomous vehicle.

In a process step 100, a check is made whether an unknown object has been identified in data relating to the surroundings that were captured by a sensor system of an object recognition means; that is, to determine whether a corner case applies. If this is not the case, process step 100 is repeated.

If an unknown object has been identified, in process step 101, said unknown object is found in at least one database by means of a searching means. This is done, in particular, on the basis of image-based data relating to the surroundings in an image database.

It can be provided therein that said finding comprises extracting metadata on the basis of the search result provided by the image database.

In a subsequent process step 102, typical properties of the unknown object are determined on the basis of the search result by means of the searching means.

Furthermore, it can be provided herein that, on the basis of extracted metadata, a wordnet describing the unknown object is created, which forms the basis for determining the typical properties.

It can, further, be provided that the determining of the typical properties comprises a search of a machine-readable database in which data that is interlinked is stored.

It may further be provided that the determining of the typical properties comprises a search of a knowledge-based system.

Additionally or alternatively, it may be provided that said determining of the typical properties comprises a search of an unstructured document.

In particular, it can be provided that said determining of the typical properties takes place on the basis of predetermined relevant properties. These predetermined relevant properties are, in particular, properties that are relevant for the consequences of making contact or a collision of the vehicle with the unknown object, such as a size, a mass, a deformability etc. of the unknown object.

It may further be provided that when determining the typical properties, a typicality for the unknown object is estimated in relation to the typical properties.

In a process step 103, a recommended course of action for the autonomous vehicle is subsequently derived on the basis of the determined typical properties of the unknown object by means of a recommendation means and provided, in process step 104, for example, to a controller of the vehicle.

If a typicality has been estimated, the recommended course of action is also derived on the basis of the estimated typicality.

Subsequently, the process is completed 105.

Figure 3:
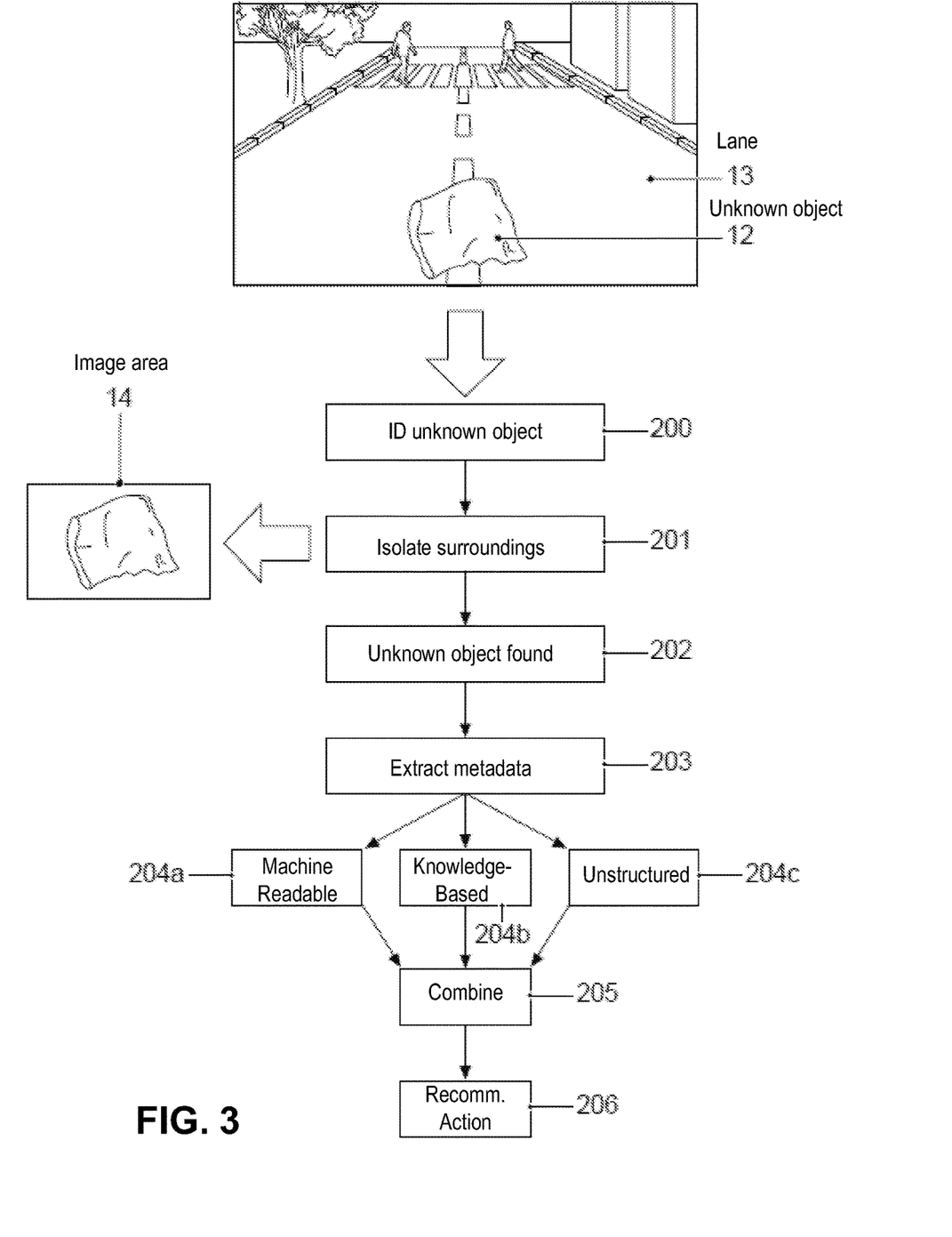
FIG. 3 shows a specific example of an application of the process for supporting autonomous travel of a vehicle.

FIG. 3 shows an exemplary flow of the process for supporting autonomous travel of a vehicle. In this example, the unknown object 12 is considered to be an empty plastic bag found in front of a vehicle in a lane 13.

In a process step 200, unknown object 12 is identified in the surroundings of the vehicle, that is to say a corner case is determined to exist. This is done by means of an object recognition means. In the shown example, although the object recognition device determines that an object is present in the surroundings, the object recognition means does not recognize the object as a "plastic bag".

In process step 201, the data relating to the surroundings associated with unknown object 12 is isolated and supplied to the searching means. In the shown example, this is an associated image area 14 which comprises unknown object 12, that is to say, the plastic bag.

The process steps 200 and 201 can also be carried out by means of a recognition device specifically designed for this purpose.

In process step 202, the unknown object is found in an image database on the basis of associated image area 14. As a result, the search provides images of objects that are similar to the unknown object 12 and/or the image thereof, respectively. In the shown example, these are plastic bags that look similar to the plastic bag that is shown.

In process step 203, metadata is extracted from the found images of the image database. In particular, the metadata comprises term captions that describe the objects depicted in each of the images; that is, terms that describe plastic bags, their surroundings, or their visual appearance in the images. These term captions may comprise, for example: plastic bag, empty/filled, big/small, an associated logo, the surroundings, etc.

It can be provided that, on the basis of the term captions that are extracted from the metadata, equivalent terms are searched for and added, so that there is a wordnet with descriptive terms. This is achieved, for example, by means of appropriate dictionaries. A simple example would be a translation of the term "plastic bag" into the German term "Plastiktüte" in order to extend the search options to the German language.

In a process step 204, typical properties for the objects found in the image database, and therefore also for the unknown object 12, are subsequently determined.

This may comprise, for example, a search in a machine-readable database (process step 204*a*) in which interlinked data is stored (e. g., on the basis of the Linked Open Data Initiative). For example, the term "plastic bag" is searched and a property "weight" that is linked thereto and, optionally, further properties are determined.

Further, this may also comprise a search of a knowledge-based system (process step 204*b*). DBpedia, for example, can be used as a knowledge-based system. Here, too, the term "plastic bag" is searched in conjunction with associated properties and the respective property is extracted from the result.

Further, the determining can also comprise a search in unstructured data (process step 204*c*), for example, in an unstructured document. For example, unstructured documents are provided online on web pages. Again, the term "plastic bag" is searched in connection with commonly used language patterns that assign properties to a noun or characterize the same such as, for example, " . . . plastic bag has . . . " or " . . . plastic bag is . . . " etc., and the respective property is extracted from the result.

In process step 205, the typical properties are combined from the respective search results. In particular, relevant properties are collected and evaluated according to a probability. The result provides physical properties, such as, for example, a mass/weight, a size and a material, etc. that the unknown object most probably possesses.

In process step 206, a recommended course of action for the autonomous vehicle is derived and provided on the basis of the typical properties of unknown object 12 by means of a recommendation means. In the case of the plastic bag on the roadway in front of the vehicle, as shown in the example, a recommended course of action—translated into everyday language—could be: "Drive over the plastic bag at a speed of 36 km/h".

LIST OF REFERENCE NUMERALS

1 System
2 Searching means
3 Recommendation means
4 Database
5 Image database
6 Search result
7 Machine-readable database
8 Knowledge-based system
9 Unstructured data
10 Typical properties
11 Metadata
12 Unknown object
13 Lane
14 Image area
20 Sensor system
21 Data relating to the surroundings
22 Object recognition means
23 Associated data relating to the surroundings
24 Recommended course of action
25 Controller
100-105 Process steps
200-206 Process steps

The invention claimed is:

1. A process for supporting an autonomous vehicle, comprising:
    capturing, via a sensor, object data associated with an object in the surroundings of the vehicle;
    performing, via a processor, object recognition on the captured object data relating to the surroundings to determine observed physical properties relating to the captured object data;
    determining, after object recognition is performed, that an unknown object is present in the surroundings;
    identifying, via the processor, one or more objects that are most similar to the unknown object, based on a distance metric of individual dimensions of image features;
    extracting metadata from the identified one or more objects to determine object physical property data for the one or more objects;
    performing, via the processor, a context-based search of at least one database to determine object physical property data that are similar to the extracted metadata;
    deriving, via the processor, a recommended course of action for the autonomous vehicle on the basis of the determined object physical data; and
    transmitting the derived recommended course of action to a controller of the autonomous vehicle.

2. The process according to claim 1, wherein the determining of the unknown object is performed in an image database on the basis of image-based data relating to the surroundings.

3. The process according to claim 1, further comprising generating a wordnet describing the unknown object on the basis of the extracted metadata.

4. The process according to claim 1, wherein performing the context-based search comprises searching of a machine-readable database that stores interlinked data.

5. The process according to claim 1, wherein performing the context-based search comprises searching a knowledge-based system.

6. The process according to claim 1, wherein performing the object recognition comprises searching unstructured data.

7. The process according to claim 1, wherein performing the object recognition comprises a search and determination of predetermined relevant properties.

8. The process according to claim 7, wherein performing the object recognition comprises estimating a typicality for the unknown object with respect to typical object physical property data, and wherein the recommended course of action is derived on the basis of the estimated typicality.

9. A system for supporting an autonomous vehicle, comprising:
    at least one database, for storing object physical property data associated with a plurality of objects;
    a sensor, for capturing object data associated with an object in the surroundings of the vehicle;
    a processor, operatively coupled to the sensor and the at least one database, wherein the processor is configured to
    perform object recognition on the captured object data relating to the surroundings to determine observed physical properties relating to the captured object data;
    determine, after object recognition is performed, that an unknown object is present in the surroundings;
    identify one or more objects in the database that are most similar to the unknown object, based on a distance metric of individual dimensions of image features;
    extracting metadata from the identified one or more objects to determine object physical property data for the one or more objects;
    performing, via the processor, a context-based search of at least one database to determine object physical property data that are similar to the extracted metadata;
    deriving, via the processor, a recommended course of action for the autonomous vehicle on the basis of the determined object physical data; and
    transmit the derived recommended course of action to a controller of the autonomous vehicle.

10. The system according to claim 9, wherein the processor is configured to determine the unknown object by searching and processing an image database on the basis of image-based data relating to the surroundings.

11. The system according to claim 9, wherein the processor is configured to generate a wordnet describing the unknown object on the basis of the extracted metadata.

12. The system according to claim 9, wherein the processor is configured to perform the context-based search by searching of a machine-readable database that stores interlinked data.

13. The system according to claim 9, wherein the processor is configured to perform the context-based search by searching a knowledge-based system.

14. The system according to claim 9, wherein the processor is configured to perform the object recognition by searching unstructured data.

15. The system according to claim 9, wherein the processor is configured to search and determine predetermined relevant properties.

16. The system according to claim 15, wherein the processor is configured to perform the object recognition by estimating a typicality for the unknown object with respect to typical object physical property data, and wherein the recommended course of action is derived on the basis of the estimated typicality.

17. A process for supporting an autonomous vehicle, comprising:
    capturing, via a sensor, object data associated with an object in the surroundings of the vehicle;
    performing, via a processor, object image-data recognition on the captured object data relating to the surroundings to determine observed physical properties relating to the captured object data;
    determining, after object recognition is performed, that an unknown object is present in the surroundings;
    identifying one or more objects via the processor that are most similar to the unknown object, based on a distance metric of individual dimensions of image features;
    extracting metadata from the identified one or more objects to determine object physical property data for the one or more objects;
    performing, via the processor, a context-based search of at least one database to determine object physical property data that are similar to the extracted metadata;
    deriving, via the processor, a recommended course of action for the autonomous vehicle on the basis of the determined object physical data; and
    transmitting the derived recommended course of action to a controller of the autonomous vehicle.

* * * * *